(12) United States Patent
Kato et al.

(10) Patent No.: US 11,407,301 B2
(45) Date of Patent: Aug. 9, 2022

(54) VEHICLE DRIVE DEVICE

(71) Applicant: AISIN CORPORATION, Aichi (JP)

(72) Inventors: Hiroshi Kato, Kariya (JP); Daiki Suyama, Kariya (JP); Takuyo Maeda, Kariya (JP); Keita Inda, Kariya (JP); Kohei Ono, Kariya (JP); Toshihisa Mizutani, Kariya (JP); Ryosuke Muramatsu, Kariya (JP); Wataru Takaki, Kariya (JP); Tetsuro Kobayashi, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/294,821

(22) PCT Filed: Jan. 17, 2020

(86) PCT No.: PCT/JP2020/001585
§ 371 (c)(1),
(2) Date: May 18, 2021

(87) PCT Pub. No.: WO2020/149411
PCT Pub. Date: Jul. 23, 2020

(65) Prior Publication Data
US 2021/0402867 A1    Dec. 30, 2021

(30) Foreign Application Priority Data
Jan. 17, 2019  (JP) .............................. JP2019-006154

(51) Int. Cl.
*B60K 6/405*      (2007.10)
*B60K 6/365*      (2007.10)
(Continued)

(52) U.S. Cl.
CPC .............. *B60K 6/405* (2013.01); *B60K 6/365* (2013.01); *B60K 6/48* (2013.01); *F16H 57/0401* (2013.01);
(Continued)

(58) Field of Classification Search
None
See application file for complete search history.

(56) References Cited

U.S. PATENT DOCUMENTS 9,718,463 B2 *   8/2017  Kaltenbach ........... B60W 10/08
10,744,874 B2 *  8/2020  Hidaka .................... B60K 6/48
(Continued)

FOREIGN PATENT DOCUMENTS

EP    2542435 B1    8/2016
EP    3415354 A1    12/2018
(Continued)

OTHER PUBLICATIONS

Written Opinion JP 202056508 (Year: 2022).*
ISR PCT/JP2020/001586 (Year: 2022).*
Jul. 28, 2021 Search Report issued in European Patent Application No. 20741806.2.

*Primary Examiner* — Dirk Wright
(74) *Attorney, Agent, or Firm* — Oliff PLC

(57) ABSTRACT

A first case portion includes an end wall portion disposed on a first axial side with respect to a transmission. A second case portion is disposed on the first axial side with respect to a rotor of a rotary electric machine, and includes a first support portion that supports a rotor shaft and a second support portion disposed on a second axial side with respect to the rotor of the rotary electric machine to support the rotor shaft. The second support portion includes a bearing attachment portion to which a rotor bearing for supporting the rotor shaft is attached, and radially extending portion that extends from bearing attachment portion toward an outer side in a radial direction. A speed reducer is disposed between the
(Continued)

radially extending portion and the end wall portion in axial direction to face the radially extending portion and the end wall portion in the axial direction.

9 Claims, 4 Drawing Sheets

(51) Int. Cl.
　　　*B60K 6/48*　　　(2007.10)
　　　*F16H 57/04*　　　(2010.01)
　　　*H02K 7/00*　　　(2006.01)
(52) U.S. Cl.
　　　CPC ........... *F16H 57/043* (2013.01); *H02K 7/006* (2013.01); *B60K 2006/4808* (2013.01); *B60K 2006/4825* (2013.01); *B60K 2006/4833* (2013.01)

(56) References Cited

U.S. PATENT DOCUMENTS

| | | |
|---|---|---|
| 2013/0217537 A1 | 8/2013 | Kaltenbach |
| 2019/0031022 A1 | 1/2019 | Hidaka et al. |

FOREIGN PATENT DOCUMENTS

| | | | |
|---|---|---|---|
| JP | 2008-126710 A | 6/2008 | |
| JP | 2008-143260 A | 6/2008 | |
| JP | 2011-125096 A | 6/2011 | |
| JP | 2017-177964 A | 10/2017 | |
| WO | 2013/113103 A1 | 8/2013 | |
| WO | WO-2014091587 A1 * | 6/2014 | ............... B60K 6/48 |

* cited by examiner

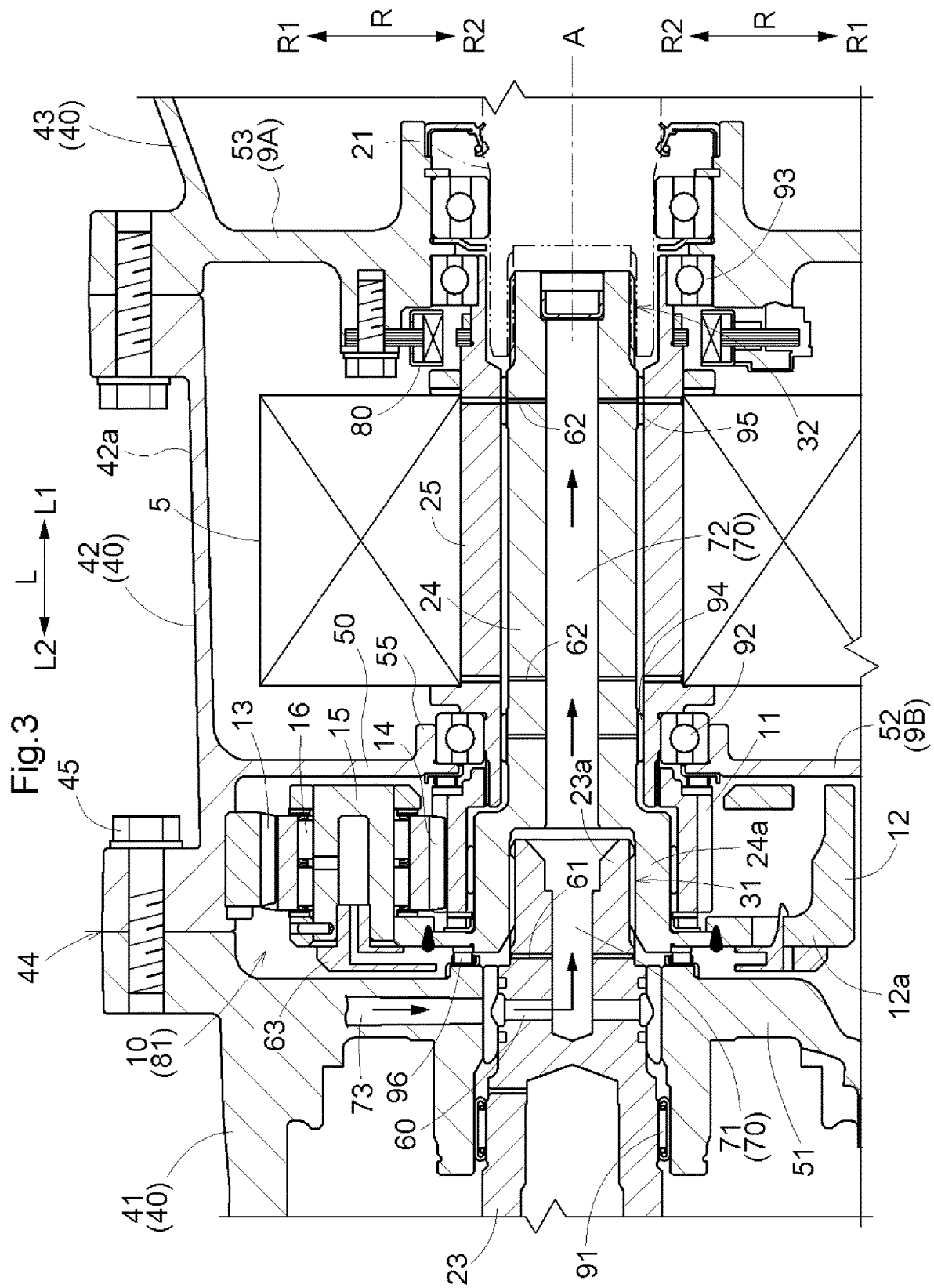

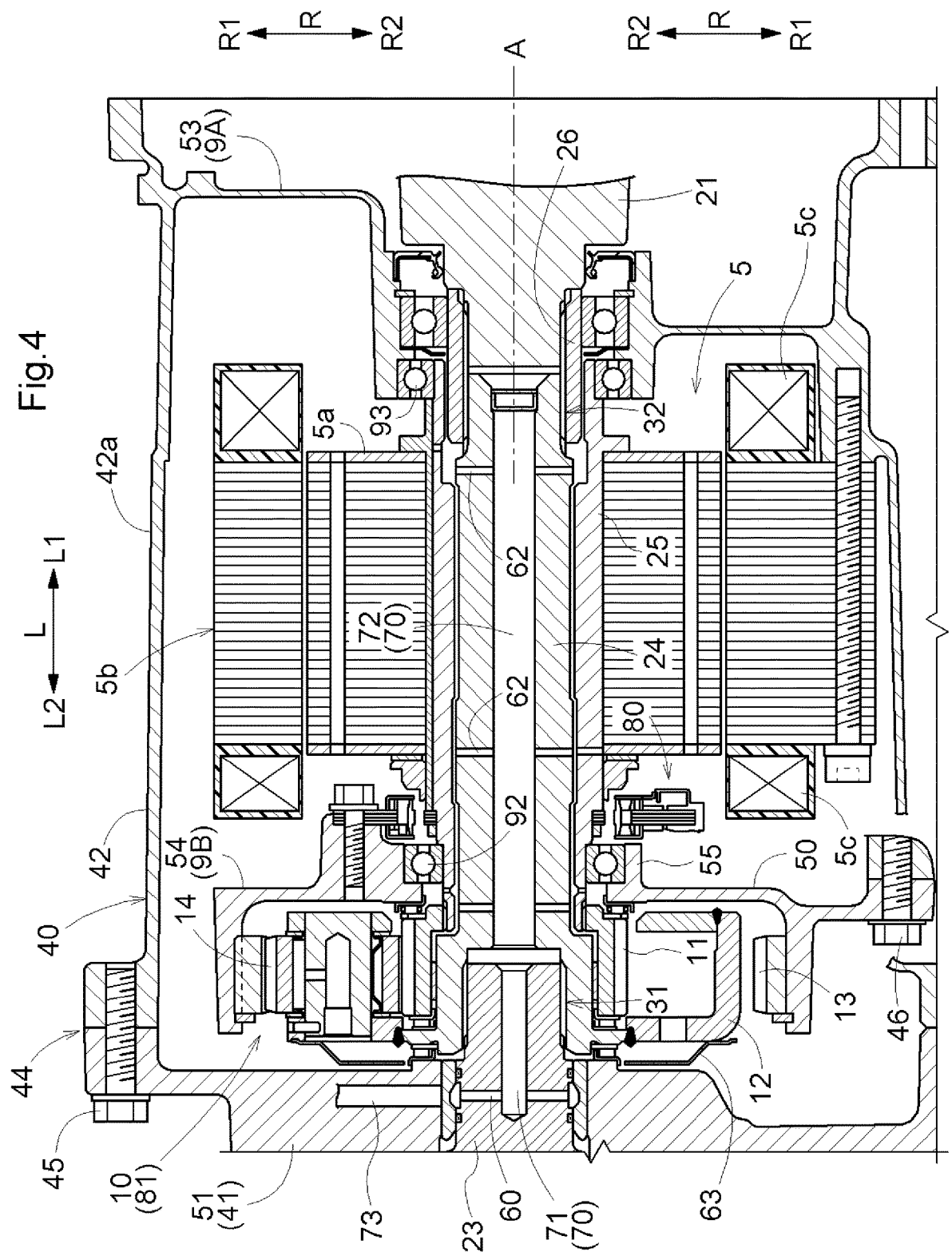

VEHICLE DRIVE DEVICE

TECHNICAL FIELD

The present disclosure relates to a vehicle drive device that includes an input member drivingly coupled to an internal combustion engine, an output member drivingly coupled to wheels, a transmission provided in a first power transfer path that connects between the input member and the output member, a rotary electric machine that can transfer a drive force to the first power transfer path via a second power transfer path, and a speed reducer provided in the second power transfer path.

BACKGROUND ART

It is conceivable to configure the vehicle drive device described above to be able to transfer the drive force of the rotary electric machine via the second power transfer path to a portion of the first power transfer path on the side of the output member with respect to the transmission, and dispose the speed reducer between the transmission and the rotary electric machine in the axial direction. An example of the thus configured vehicle drive device is illustrated in FIG. 7 of European Patent No. 2542435 (Patent Document 1).

RELATED-ART DOCUMENTS

Patent Documents

Patent Document 1: European Patent No. 2542435

SUMMARY OF THE DISCLOSURE

Problem to be Solved by the Disclosure

In the vehicle drive device described above, it is necessary to support each of the transmission, the speed reducer, and the rotary electric machine, and it is desirable that the rotary electric machine should be supported on both sides in the axial direction, in order to enhance the precision in supporting the rotary electric machine. In consideration of the mountability of the vehicle drive device on a vehicle etc., it is desirable that the axial dimension of the vehicle drive device should be suppressed to be small, even in the case where the transmission, the speed reducer, and the rotary electric machine are arranged side by side in the axial direction, by disposing the speed reducer between the transmission and the rotary electric machine in the axial direction as described above. However, Patent Document 1 does not describe such issues.

Thus, it is desirable to achieve a technique that enables a reduction in the axial dimension of a vehicle drive device while appropriately supporting each rotary member in the case where a speed reducer is disposed between a transmission and a rotary electric machine in the axial direction.

Means for Solving the Problem

The present disclosure provides a vehicle drive device including: an input member drivingly coupled to an internal combustion engine; an output member drivingly coupled to wheels; a transmission provided in a first power transfer path that connects between the input member and the output member to transfer rotation transferred from a side of the input member to a transmission output member with a speed of the rotation varied; a rotary electric machine capable of transferring a drive force via a second power transfer path to a portion of the first power transfer path on a side of the output member with respect to the transmission output member; a speed reducer provided in the second power transfer path to transfer rotation transferred from a side of the rotary electric machine to the side of the output member with a speed of the rotation reduced; and a case, in which: the rotary electric machine and the speed reducer are disposed coaxially with the transmission output member on a first axial side, which is one side in an axial direction, with respect to the transmission; the case includes a first case portion that supports the transmission and the transmission output member, and a second case portion that supports the rotary electric machine; the first case portion includes an end wall portion disposed on the first axial side with respect to the transmission; the second case portion includes a first support portion disposed on the first axial side with respect to a rotor of the rotary electric machine to support a rotor shaft that rotates together with the rotor, and a second support portion disposed on a second axial side, which is opposite to the first axial side in the axial direction, with respect to the rotor to support the rotor shaft; the second support portion includes a bearing attachment portion to which a rotor bearing for supporting the rotor shaft is attached, and a radially extending portion that extends from the bearing attachment portion toward an outer side in a radial direction; and the speed reducer is disposed between the radially extending portion and the end wall portion in the axial direction to face the radially extending portion and the end wall portion in the axial direction.

With this configuration, output torque of the rotary electric machine can be transferred to the output member via the speed reducer. Hence, it is easy to secure a necessary drive force by driving the wheels by transferring, to the output member, rotation of the rotary electric machine after the speed reducer reduces the speed of the rotation, in addition to rotation of the internal combustion engine after the transmission varies the speed of the rotation.

With the configuration described above, the transmission and the transmission output member can be supported by the first case portion, and the rotary electric machine can be supported on both sides in the axial direction by the first support portion and the second support portion of the second case portion. In the configuration described above, the speed reducer is disposed between the radially extending portion of the second case portion and the end wall portion of the first case portion in the axial direction to face the radially extending portion and the end wall portion in the axial direction. Therefore, the speed reducer can be supported using at least one of the second case portion which includes the radially extending portion and the first case portion which includes the end wall portion, even if no wall portion is provided to support the speed reducer, separately from the radially extending portion and the end wall portion. That is, a dedicated support wall for supporting the speed reducer can be removed by causing the radially extending portion or the end wall portion to also serve as a support wall that supports the speed reducer, and it is possible to reduce the axial dimension of the vehicle drive device compared to the case where such a dedicated support wall is provided.

With the configuration described above, it is advantageously easy to reduce the span of support for the rotor shaft by the first support portion and the second support portion, and easy to enhance the precision in supporting the rotor shaft, compared to the case where the speed reducer is disposed between the rotary electric machine and the radially extending portion in the axial direction.

With the configuration described above, as described above, it is possible to reduce the axial dimension of the vehicle drive device while appropriately supporting each rotary member.

Further characteristics and advantages of the vehicle drive device will become clear from the following description of embodiments made with reference to the drawings.

BRIEF DESCRIPTION OF THE DRAWINGS

FIG. 3 is a partial enlarged view of FIG. 2.

FIG. 4 is a sectional view of a part of a vehicle drive device according to a second embodiment.

MODES FOR CARRYING OUT THE DISCLOSURE

First Embodiment

Figure 1:
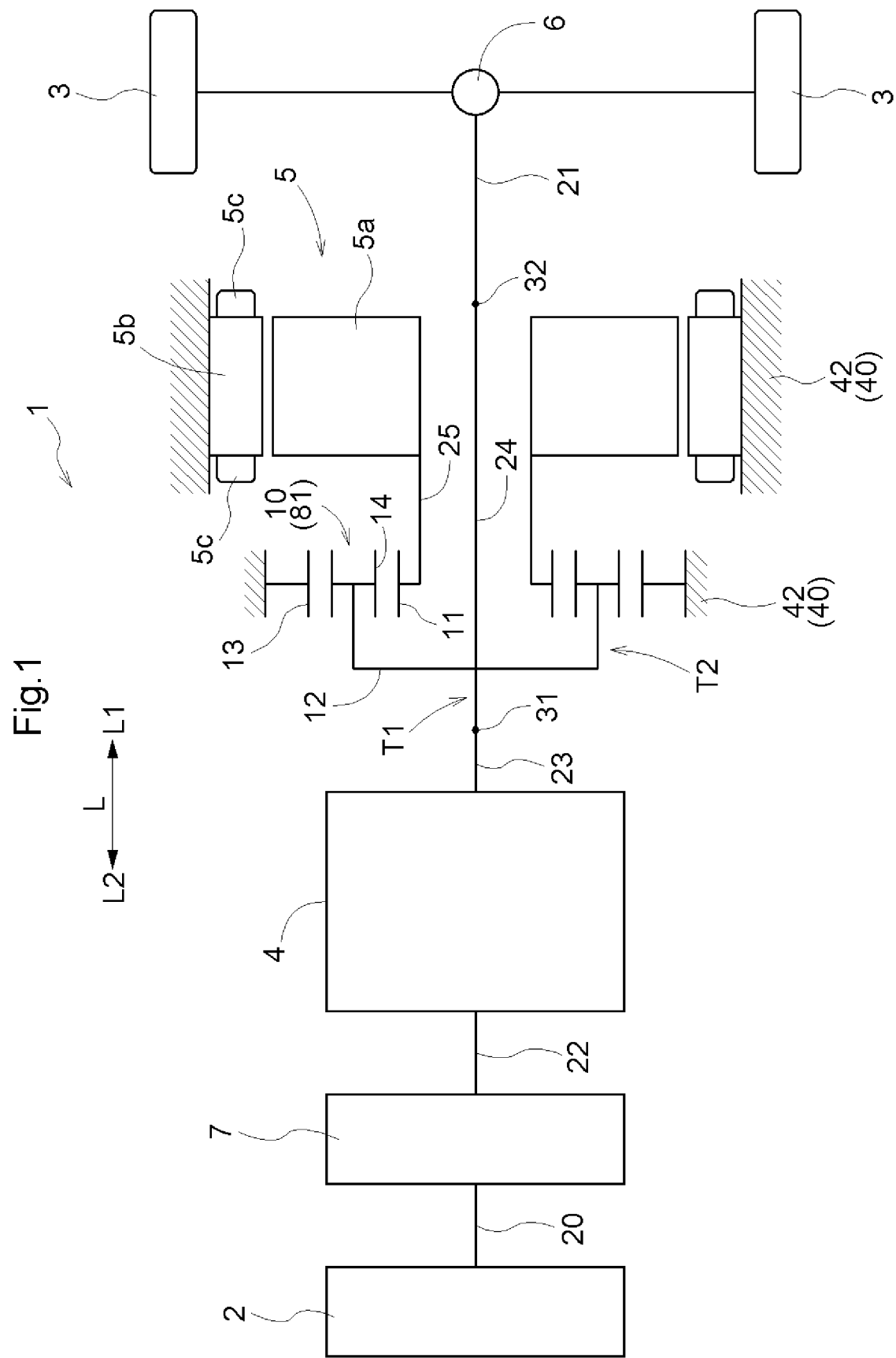
FIG. 1 is a schematic diagram illustrating a schematic configuration of a vehicle drive device according to a first embodiment.
Figure 2:
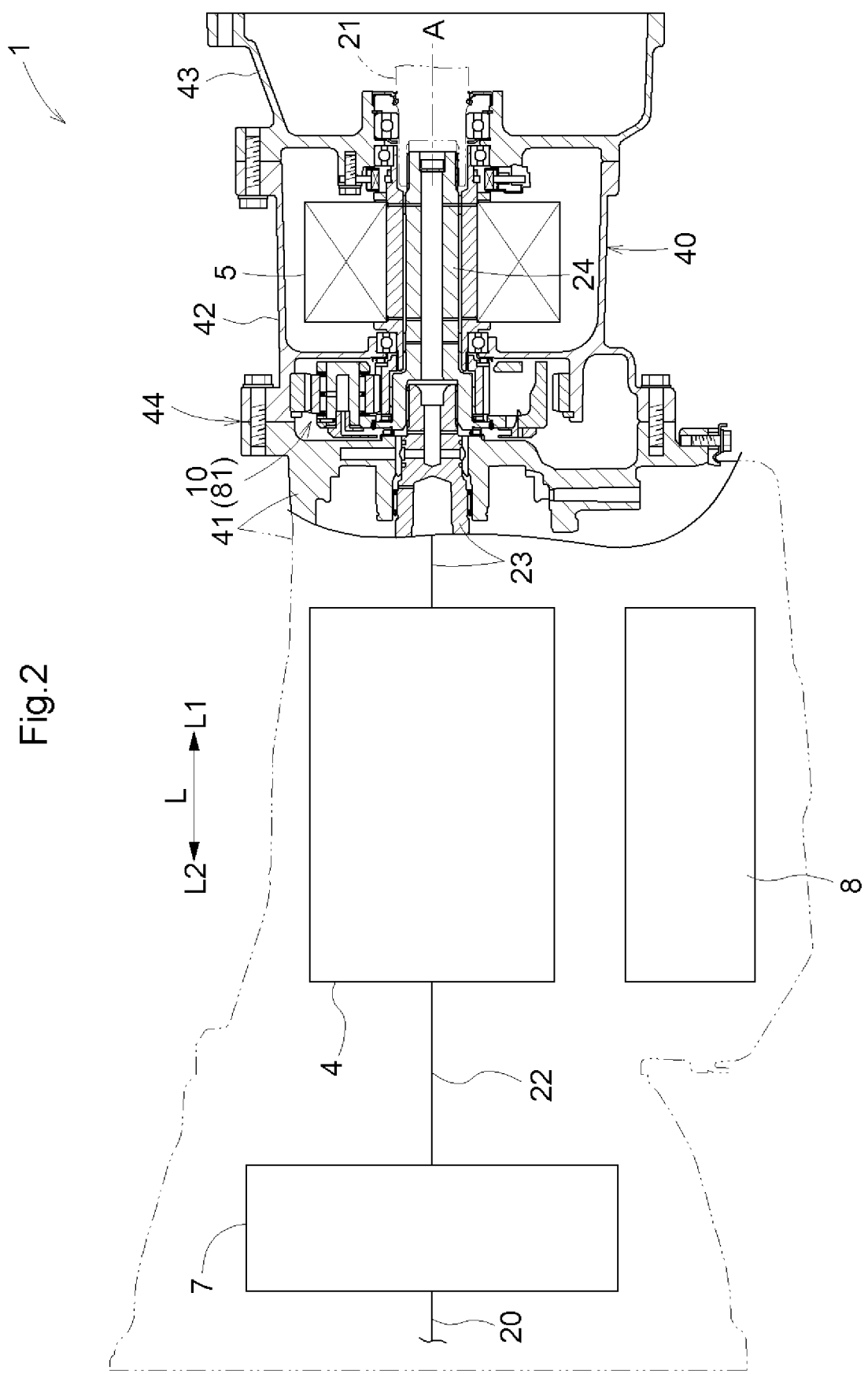
FIG. 2 is a sectional view illustrating the vehicle drive device according to the first embodiment as partially simplified.

A vehicle drive device 1 according to a first embodiment will be described with reference to the drawings (FIGS. 1 to 3). In the following description, unless specifically differentiated, the "axial direction L", the "radial direction R", and the "circumferential direction" are defined with reference to a rotational axis A (see FIGS. 2 and 3) of a transmission output member 23 to be discussed later. The transmission output member 23 and rotary members disposed coaxially with the transmission output member 23 rotate about the rotational axis A. One side in the axial direction L is defined as a "first axial side L1", and the other side in the axial direction L (the opposite side from the first axial side L1 in the axial direction L) is defined as a "second axial side L2". The outer side in the radial direction R is defined as a "radially outer side R1", and the inner side in the radial direction R is defined as a "radially inner side R2" (see FIG. 3). In the following description, directions for each member indicate directions with that member assembled to a vehicle drive device 1. Terms related to the dimension, arrangement direction, arrangement position, etc. of each member may allow a difference due to an error (an allowable manufacturing error).

The term "drivingly coupled" as used herein refers to a state in which two rotary elements are coupled in such a manner that enables transfer of a drive force (which is synonymous with torque), which includes a state in which the two rotary elements are coupled so as to rotate together with each other, and a state in which the two rotary elements are coupled in such a manner that enables transfer of a drive force via one or two or more transmission members. Examples of such transmission members include various members (e.g. a shaft, a gear mechanism, a belt, a chain, etc.) that transfer rotation at an equal speed or a changed speed. Additional examples of such transmission members may include engagement devices (e.g. a friction engagement device, a meshing-type engagement device, etc.) that selectively transfer rotation and a drive force.

The term "rotary electric machine" as used herein refers to any of a motor (electric motor), a generator (electric generator), and a motor/generator that functions both as a motor and as a generator as necessary. With regard to the arrangement of two members, the phrase "overlap each other as seen in a specific direction" as used herein means that when an imaginary line that is parallel to the viewing direction is moved in directions that are orthogonal to the imaginary line, the imaginary line crosses both of the two members in at least some region.

As illustrated in FIG. 1, the vehicle drive device 1 includes an input member 20 drivingly coupled to an internal combustion engine 2, an output member 21 drivingly coupled to wheels 3, a transmission 4 provided in a first power transfer path T1 that connects between the input member 20 and the output member 21, a rotary electric machine 5 that can transfer a drive force via a second power transfer path T2 to a portion of the first power transfer path T1 on the side of the output member 21 with respect to the transmission output member 23, a speed reducer 81 provided in the second power transfer path T2, and a case 40. The vehicle drive device 1 transfers output torque of one or both of the internal combustion engine 2 and the rotary electric machine 5 to the wheels 3 via the output member 21 to drive the vehicle.

In the example illustrated in FIG. 1, the output member 21 is coupled to the two, left and right, wheels 3 (here, two, left and right, rear wheels) via a differential gear device 6 (output differential gear device), and the vehicle drive device 1 transfers output torque of one or both of the internal combustion engine 2 and the rotary electric machine 5 to the two, left and right, wheels 3 to drive the vehicle. In this manner, it is assumed in FIG. 1 that the vehicle drive device 1 is a drive device of a two-wheel-drive type in which two wheels 3 (two, left and right, front wheels or two, left and right, rear wheels) are driven, and it is assumed in FIG. 2, to be referenced later, that the vehicle drive device 1 is a drive device of a four-wheel-drive type in which the four wheels 3 (two, left and right, front wheels and two, left and right, rear wheels) are driven. In this case, although not illustrated, the output member 21 is coupled to the two, left and right, front wheels via a transfer and a differential gear device for the front wheels, and coupled to the two, left and right, rear wheels via the transfer and a differential gear device for the rear wheels. The transfer is a device that distributes torque input from the side of the output member 21 to the side of the front wheels and the side of the rear wheels. In this manner, the vehicle drive device 1 is applicable to any of the drive device of the two-wheel-drive type and the drive device of the four-wheel-drive type.

The input member 20 is drivingly coupled to an output shaft (such as a crankshaft) of the internal combustion engine 2. The input member 20 is coupled so as to rotate together with the output member of the internal combustion engine 2, for example. In the present embodiment, the input member 20 is disposed coaxially with the transmission output member 23 on the second axial side L2 with respect to the transmission output member 23. The internal combustion engine 2 is a motor (e.g. a gasoline engine, a diesel engine, etc.) driven by combusting fuel inside the engine to take out power.

The transmission 4 transfers rotation transferred from the side of the input member 20 to the transmission output member 23 with the speed of the rotation varied. Specifically, the transmission 4 transfers rotation transferred from the side of the input member 20 to a transmission input member 22 to the transmission output member 23 with the speed of the rotation varied. The transmission input member 22 is a member that allows input of rotation from the side of the input member 20 to the transmission 4. The transmission output member 23 is a member that allows output of rotation from the transmission 4 to the side of the output member 21.

In the present embodiment, the transmission input member 22 is disposed coaxially with the transmission output member 23 on the second axial side L2 with respect to the transmission output member 23. The transmission 4 is configured to be capable of changing the speed ratio, which is the ratio of the rotational speed of the transmission input member 22 to the rotational speed of the transmission output member 23, stepwise or continuously, and transfers rotation of the transmission input member 22 to the transmission output member 23 with the speed of the rotation varied with the current speed ratio.

In the present embodiment, a torque converter 7 (an example of a fluid coupling) is provided in a power transfer path between the input member 20 and the transmission input member 22. A damper may be provided in the power transfer path between the input member 20 and the transmission input member 22, in addition to or in place of the torque converter 7. A configuration in which the input member 20 and the transmission input member 22 are coupled so as to rotate together with no torque converter 7 provided in the power transfer path between the input member 20 and the transmission input member 22 and a configuration in which the input member 20 and the transmission input member 22 are formed integrally (i.e. the input member 20 functions as a transmission input member) are also possible. Alternatively, a configuration in which a second rotary electric machine that functions as a drive force source for the wheels 3 is provided separately from the rotary electric machine 5 and a power distribution mechanism (such as a planetary gear mechanism) that distributes torque transferred from the side of the input member 20 to the second rotary electric machine and the transmission input member 22 is provided in the power transfer path between the input member 20 and the transmission input member 22 is also possible. In the case where the torque converter 7 is provided in the power transfer path between the input member 20 and the transmission input member 22, the power distribution mechanism is provided in a power transfer path between the torque converter 7 and the transmission input member 22, for example.

The rotary electric machine 5 includes a stator 5b fixed to the case 40 (specifically, a rotary electric machine case 42 to be discussed later) and a rotor 5a rotatably supported with respect to the stator 5b. The stator 5b includes a stator core and a coil wound around the stator core. Coil end portions 5c which are portions of the coil that project in the axial direction L from the stator core are formed on both sides of the stator core in the axial direction L. In the present embodiment, the rotary electric machine 5 is a rotary electric machine of an inner rotor type, and the rotor 5a is disposed at a position on the radially inner side R2 with respect to the stator 5b and at which the rotor 5a overlaps the stator 5b as viewed in the radial direction along the radial direction R. The rotor 5a is coupled so as to rotate together with a rotor shaft 25. The rotor shaft 25 is formed in the shape of a tube that extends in the axial direction L (specifically, a cylindrical shape). Here, the rotor shaft 25 is disposed to penetrate the radially inner side R2 of the rotor 5a in the axial direction L, and the rotor 5a is fixed to the outer peripheral surface of the rotor shaft 25. In FIGS. 2 and 3, the rotary electric machine 5 is not illustrated in detail, and the rotary electric machine 5 is illustrated in a simplified manner.

The output torque (drive force) of the rotary electric machine 5 is transferred to an intermediate member 24, which is provided in the first power transfer path T1, via the second power transfer path T2. The second power transfer path T2 is a power transfer path that connects between the rotary electric machine 5 and the intermediate member 24. Output torque of the rotary electric machine 5 is transferred to the output member 21 via the second power transfer path T2 and a portion of the first power transfer path T1 that connects between the intermediate member 24 and the output member 21. The intermediate member 24 is provided in a portion of the first power transfer path T1 on the side of the output member 21 with respect to the transmission output member 23. The output member 21 is coupled to the transmission output member 23 via the intermediate member 24. In the present embodiment, the intermediate member 24 is a shaft member formed in the shape of a tube that extends in the axial direction L (specifically, a cylindrical shape). In the present embodiment, the intermediate member 24 is coupled so as to rotate together with the transmission output member 23, and coupled so as to rotate together with the output member 21. That is, the intermediate member 24 couples the transmission output member 23 and the output member 21 so as to rotate together with each other.

The rotary electric machine 5 and the speed reducer 81 are disposed coaxially with the transmission output member 23 on the first axial side L1 with respect to the transmission 4. The intermediate member 24 is also disposed coaxially with the transmission output member 23 on the first axial side L1 with respect to the transmission 4. In the present embodiment, as illustrated in FIG. 3, the outer peripheral surface of the intermediate member 24 is formed to be smaller in diameter than the inner peripheral surface of the rotor shaft 25, and the intermediate member 24 is disposed at a position on the radially inner side R2 with respect to the rotor shaft 25 and at which the intermediate member 24 overlaps the rotor shaft 25 as viewed in the radial direction.

The speed reducer 81 is provided in the second power transfer path T2, and transfers rotation transferred from the side of the rotary electric machine 5 to the side of the output member 21 (in other words, to the side of the intermediate member 24) with the speed of the rotation reduced. The speed reducer 81 is disposed coaxially with the transmission output member 23 between the transmission 4 and the rotary electric machine 5 in the axial direction L. In the present embodiment, no speed change mechanism is provided in the second power transfer path T2 except for the speed reducer 81, and rotation of the rotary electric machine 5 is transferred to the intermediate member 24 with the speed of the rotation reduced in accordance with the gear ratio of the speed reducer 81. In the present embodiment, no engagement device that selectively couples the rotary electric machine 5 and the intermediate member 24 is provided in the second power transfer path T2, and the rotary electric machine 5 rotates in conjunction with the intermediate member 24 at all times.

In the present embodiment, the speed reducer 81 is constituted using a planetary gear mechanism 10 that includes a sun gear 11 coupled to the rotary electric machine 5, a carrier 12 coupled to the intermediate member 24, and a ring gear 13 fixed to the case 40 (specifically, a rotary electric machine case 42 to be discussed later). As illustrated in FIG. 3, the planetary gear mechanism 10 includes a pinion shaft 15 that supports a pinion gear 14 such that the pinion gear 14 is rotatable via a pinion shaft 16 from the inner side in the radial direction (radial direction with reference to the pinion gear 14), and the carrier 12 holds the pinion shaft 15. In the present embodiment, the sun gear 11 is coupled so as to rotate together with the rotary electric machine 5, and the carrier 12 is coupled so as to rotate together with the intermediate member 24. The planetary gear mechanism 10 is a single-pinion planetary gear mechanism. Hence, rotation input from the rotary electric machine 5 to the sun gear 11 is output from the carrier 12 to the intermediate member 24 with the speed of the rotation reduced in accordance with the gear ratio of the planetary gear mechanism 10.

As illustrated in FIG. 2, the case 40 includes a transmission case 41 and a rotary electric machine case 42 joined to the first axial side L1 of the transmission case 41. In the present embodiment, as illustrated in FIG. 3, the transmission case 41 and the rotary electric machine case 42 are joined to each other using a fastening bolt 45. A joint portion 44 between the transmission case 41 and the rotary electric machine case 42 is formed at the position of a plane (joint plane) on which a surface of the transmission case 41 to be joined to the rotary electric machine case 42 and a surface of the rotary electric machine case 42 to be joined to the transmission case 41 contact each other. In the present embodiment, the joint portion 44 is disposed at a position on the radially outer side R1 with respect to the speed reducer 81 and at which the joint portion 44 overlaps the speed reducer 81 as viewed in the radial direction. Specifically, the joint portion 44 is disposed at a position on the radially outer side R1 with respect to the planetary gear mechanism 10 and at which the joint portion 44 overlaps the planetary gear mechanism 10 as viewed in the radial direction. As illustrated in FIG. 3, the carrier 12 of the planetary gear mechanism 10 includes an annular plate-like portion 12a formed in an annular plate shape to hold an end portion of the pinion shaft 15 on the second axial side L2, and the joint portion 44 is disposed at a position at which the joint portion 44 overlaps the annular plate-like portion 12a as viewed in the radial direction. In the present embodiment, the transmission case 41 corresponds to the "first case portion".

As illustrated in FIG. 3, the joint portion 44 is disposed on the second axial side L2 with respect to the rotary electric machine 5. In the present embodiment, a portion (here, a flange portion that projects toward the radially outer side R1) of the rotary electric machine case 42 in which a shaft portion of the fastening bolt 45 is disposed is also disposed on the second axial side L2 with respect to the rotary electric machine 5. In the present embodiment, further, the entire fastening bolt 45 is disposed on the second axial side L2 with respect to the rotary electric machine 5.

In the present embodiment, the case 40 further includes a connection case 43 joined to the first axial side L1 of the rotary electric machine case 42. Here, the rotary electric machine case 42 and the connection case 43 are joined to each other using a fastening bolt. As discussed above, a case where the vehicle drive device 1 is a drive device of a four-wheel-drive type is assumed in FIG. 2. The connection case 43 is coupled to the second axial side L2 of the transfer (not illustrated). That is, the connection case 43 connects between the rotary electric machine case 42 and the transfer (specifically, a case of the transfer). In the present embodiment, the rotary electric machine case 42 and the connection case 43 correspond to the "second case portion". That is, a case portion (case group) that includes the rotary electric machine case 42 and the connection case 43 corresponds to the "second case portion". The joint portion 44 between the transmission case 41 and the rotary electric machine case 42 corresponds to the "joint portion between the first case portion and the second case portion".

In the present embodiment, as illustrated in FIG. 3, the case 40 includes a first wall portion 51, a second wall portion 52, and a third wall portion 53. The second wall portion 52 is disposed on the first axial side L1 with respect to the first wall portion 51. The third wall portion 53 is disposed on the first axial side L1 with respect to the second wall portion 52.

Here, the transmission case 41 includes the first wall portion 51, the rotary electric machine case 42 includes the second wall portion 52, and the connection case 43 includes the third wall portion 53. Each of the first wall portion 51, the second wall portion 52, and the third wall portion 53 is formed so as to extend in the radial direction R and, in the present embodiment, formed in the shape of an annular plate that extends also in the circumferential direction in addition to the radial direction R. The transmission 4 is disposed on the second axial side L2 with respect to the first wall portion 51. That is, the transmission case 41 includes the first wall portion 51 which is disposed on the first axial side L1 with respect to the transmission 4. The speed reducer 81 (planetary gear mechanism 10) is disposed between the first wall portion 51 and the second wall portion 52 in the axial direction L. The rotary electric machine 5 is disposed between the second wall portion 52 and the third wall portion 53 in the axial direction L. In the present embodiment, the second wall portion 52 is provided with a radially extending portion 50 to be discussed later. The speed reducer 81 (planetary gear mechanism 10) is disposed between the radially extending portion 50 and the first wall portion 51 in the axial direction L to face the radially extending portion 50 and the first wall portion 51 in the axial direction L. Here, the speed reducer 81 is disposed in a housing chamber defined by the radially extending portion 50 and the first wall portion 51 on both sides in the axial direction L. The rotary electric machine 5 is disposed between the radially extending portion 50 and the third wall portion 53 in the axial direction L. The case 40 includes a peripheral wall portion that surrounds objects to be housed inside the case 40 from the radially outer side R1. The first wall portion 51, the second wall portion 52, and the third wall portion 53 may be formed integrally with the peripheral wall portion so as to extend from the peripheral wall portion toward the radially inner side R2, or may be a separate member fixed to the peripheral wall portion. In the present embodiment, the first wall portion 51 corresponds to the "end wall portion".

As described above, the speed reducer 81 is disposed between the radially extending portion 50 and the first wall portion 51 in the axial direction L to face the radially extending portion 50 and the first wall portion 51 in the axial direction L. That is, the speed reducer 81 is disposed to face the first wall portion 51 in the axial direction L. In other words, the speed reducer 81 is disposed to directly face the first wall portion 51 in the axial direction L. No wall portion (e.g. wall portion that extends in the radial direction R and the circumferential direction) is disposed between the speed reducer 81 and the first wall portion 51 in the axial direction L. Here, the speed reducer 81 is disposed adjacently on the first axial side L1 with respect to the first wall portion 51. The speed reducer 81 is disposed to face the radially extending portion 50 in the axial direction L. In other words, the speed reducer 81 is disposed to directly face the radially extending portion 50 in the axial direction L. No wall portion (e.g. wall portion that extends in the radial direction R and the circumferential direction) is disposed between the speed reducer 81 and the radially extending portion 50 in the axial direction L. Here, the speed reducer 81 is disposed adjacently on the second axial side L2 with respect to the radially extending portion 50.

As illustrated in FIG. 3, the rotary electric machine case 42 includes a peripheral wall portion 42a that surrounds the rotary electric machine 5 from the radially outer side R1. In the present embodiment, the second wall portion 52 is formed integrally with the peripheral wall portion 42a. Therefore, the third wall portion 53, which is disposed on the opposite side in the axial direction L of the rotary electric machine 5 from the side on which the second wall portion 52 is disposed, is a member that is separate from the peripheral wall portion 42*a*. In the present embodiment, the third wall portion 53 is provided on the connection case 43 which is a member that is separate from the rotary electric machine case 42 which includes the peripheral wall portion 42*a*. The second wall portion 52 is formed integrally with the peripheral wall portion 42*a* by casting, for example.

The transmission case 41 supports the transmission 4 and the transmission output member 23. The rotary electric machine case 42 supports the rotary electric machine 5. In the present embodiment, the rotary electric machine case 42 also supports the speed reducer 81 (planetary gear mechanism 10) and the intermediate member 24. In the present embodiment, the speed reducer 81 is supported by the rotary electric machine case 42 with the ring gear 13 fixed to the peripheral wall portion 42*a*. In this manner, one rotary element (here, the ring gear 13) of the speed reducer 81 is fixed to the rotary electric machine case 42 (here, the peripheral wall portion 42*a*). In the present embodiment, the connection case 43 supports the rotary electric machine 5 and the output member 21. Here, when a case portion "supports" a member to be supported, it is meant that the member to be supported is supported by the case portion alone, or that the member to be supported is supported by the case portion in cooperation with a different case portion. In the present embodiment, the transmission 4 and the transmission output member 23 are supported by the transmission case 41 alone, or supported by the transmission case 41 in cooperation with a different case portion joined to the second axial side L2 of the transmission case 41. That is, in the present embodiment, the transmission 4 and the transmission output member 23 are not supported by the rotary electric machine case 42. In the present embodiment, the rotary electric machine 5, the speed reducer 81 (planetary gear mechanism 10), and the intermediate member 24 are supported by the rotary electric machine case 42 alone, or supported by the rotary electric machine case 42 in cooperation with the connection case 43. That is, in the present embodiment, the rotary electric machine 5, the speed reducer 81 (planetary gear mechanism 10), and the intermediate member 24 are not supported by the transmission case 41.

Specifically, as illustrated in FIG. 3, a through hole that penetrates the first wall portion 51 in the axial direction L is formed at the central portion (an end portion on the radially inner side R2) of the first wall portion 51 in the radial direction R. The transmission output member 23 is rotatably supported by the transmission case 41 (specifically, the first wall portion 51) via a first bearing 91 (a needle bearing in the present example) disposed between the outer peripheral surface of the transmission output member 23 and the inner peripheral surface of the through hole of the first wall portion 51. That is, the transmission output member 23 is rotatably supported by the transmission case 41 via the first bearing 91. In the present embodiment, the transmission output member 23 is disposed so as to penetrate the first wall portion 51 in the axial direction L, and a first end portion 23*a*, which is an end portion of the transmission output member 23 on the first axial side L1, is disposed so as to project toward the first axial side L1 with respect to the first wall portion 51. In the present embodiment, the first bearing 91 corresponds to the "output member bearing".

As illustrated in FIG. 3, a through hole that penetrates the second wall portion 52 in the axial direction L is formed at the central portion of the second wall portion 52 in the radial direction R. The rotor shaft 25 is rotatably supported by the rotary electric machine case 42 (specifically, the second wall portion 52) via a second bearing 92 (a ball bearing in the present example) disposed between the outer peripheral surface of the rotor shaft 25 (specifically, a portion of the rotor shaft 25 that projects toward the second axial side L2 with respect to the rotor 5*a*) and the inner peripheral surface of the through hole of the second wall portion 52. That is, the rotor 5*a* (specifically, the rotor shaft 25) is rotatably supported by the rotary electric machine case 42 via the second bearing 92. The second bearing 92 is disposed on the second axial side L2 with respect to the rotor 5*a*. In the present embodiment, the second bearing 92 corresponds to the "rotor bearing".

A through hole that penetrates the third wall portion 53 in the axial direction L is formed at the central portion of the third wall portion 53 in the radial direction R. The rotor shaft 25 is rotatably supported by the connection case 43 (specifically, the third wall portion 53) via a third bearing 93 (a ball bearing in the present example) disposed between the outer peripheral surface of the rotor shaft 25 (specifically, a portion of the rotor shaft 25 that projects toward the first axial side L1 with respect to the rotor 5*a*) and the inner peripheral surface of the through hole of the third wall portion 53. That is, the rotor 5*a* (specifically, the rotor shaft 25) is rotatably supported by the connection case 43 via the third bearing 93. The third bearing 93 is disposed on the first axial side L1 with respect to the rotor 5*a*. The output member 21 is supported by the connection case 43 (specifically, the third wall portion 53) via a bearing disposed on the first axial side L1 with respect to the third bearing 93. In the case where the case 40 does not include the connection case 43 as in a second embodiment to be discussed later, a through hole that supports the third bearing 93 from the radially outer side R1 is formed at an end portion of the rotary electric machine case 42 on the first axial side L1.

In this manner, in the present embodiment, the connection case 43 includes a first support portion 9A disposed on the first axial side L1 with respect to the rotor 5*a* to support the rotor shaft 25 which rotates together with the rotor 5*a*. The rotary electric machine case 42 includes a second support portion 9B disposed on the second axial side L2 with respect to the rotor 5*a* to support the rotor shaft 25. In the present embodiment, the third wall portion 53 constitutes the first support portion 9A, and the second wall portion 52 constitutes the second support portion 9B. The second support portion 9B (second wall portion 52) includes a bearing attachment portion 55 (here, a boss portion) for attachment of the second bearing 92 for supporting the rotor shaft 25, and the radially extending portion 50 which extends from the bearing attachment portion 55 toward the radially outer side R1. The bearing attachment portion 55 includes an inner peripheral surface on which the second bearing 92 is fitted. The second bearing 92 is disposed between the inner peripheral surface of the bearing attachment portion 55 and the outer peripheral surface of the rotor shaft 25. As discussed above, the speed reducer 81 (planetary gear mechanism 10) is disposed between the radially extending portion 50 and the first wall portion 51 in the axial direction L. In the present embodiment, the speed reducer 81 (planetary gear mechanism 10) is supported by the rotary electric machine case 42, and disposed to face the first wall portion 51 in the axial direction L.

As discussed above, the intermediate member 24 is disposed at a position on the radially inner side R2 with respect to the rotor shaft 25 and at which the intermediate member 24 overlaps the rotor shaft 25 as viewed in the radial direction. A fourth bearing 94 (a bush in the present example) and a fifth bearing 95 (a bush in the present example) are disposed between the outer peripheral surface of the intermediate member 24 and the inner peripheral surface of the rotor shaft 25 at different positions in the axial direction L. The intermediate member 24 is rotatably supported by the rotor shaft 25 via the fourth bearing 94 and the fifth bearing 95. That is, the intermediate member 24 is rotatably supported by the rotary electric machine case 42 and the connection case 43 indirectly via the rotor shaft 25. A sixth bearing 96 (a thrust bearing in the present example) is disposed between an end portion of the intermediate member 24 on the second axial side L2 and the first wall portion 51.

In the present embodiment, the intermediate member 24 includes a tubular portion 24a disposed on the radially outer side R1 with respect to the first end portion 23a of the transmission output member 23. Here, the tubular portion 24a is formed to be larger in diameter than a portion of the intermediate member 24 disposed inside the rotor shaft 25. The tubular portion 24a is formed at an end portion of the intermediate member 24 on the second axial side L2. The outer peripheral surface of the first end portion 23a and the inner peripheral surface of the tubular portion 24a are engaged with each other (specifically, an outer peripheral engagement portion formed on the outer peripheral surface of the first end portion 23a and an inner peripheral engagement portion formed on the inner peripheral surface of the tubular portion 24a are engaged with each other) to form a first coupling portion 31 which is a coupling portion between the transmission output member 23 and the intermediate member 24. Here, the outer peripheral engagement portion includes a plurality of outer teeth (outer peripheral spline teeth) formed so as to extend in the axial direction L and arranged side by side in the circumferential direction, the inner peripheral engagement portion includes a plurality of inner teeth (inner peripheral spline teeth) formed so as to extend in the axial direction L and arranged side by side in the circumferential direction, and the outer peripheral engagement portion and the inner peripheral engagement portion are spline-engaged with each other. In this manner, the transmission output member 23 and the intermediate member 24 are coupled to each other at the first coupling portion 31 in such a manner that permits relative movement in the axial direction L and regulates relative rotation in the circumferential direction. The intermediate member 24 is coupled to the transmission output member 23 from the first axial side L1 with the rotary electric machine case 42 joined to the first axial side L1 of the transmission case 41.

As discussed above, the transmission case 41 supports the transmission 4 and the transmission output member 23, and the rotary electric machine case 42 supports the rotary electric machine 5, the speed reducer 81 (planetary gear mechanism 10), and the intermediate member 24. Consequently, all or most components of the transmission 4, the transmission output member 23, and the transmission case 41 which supports the transmission 4 and the transmission output member 23 can be commonalized even in the case where the specifications of the rotary electric machine 5 or the speed reducer 81 (planetary gear mechanism 10) are changed. In the case where hybridization is achieved by adding the rotary electric machine 5 to an existing vehicle drive device that includes only the internal combustion engine 2 as a drive force source for the wheels 3 (e.g. a drive device obtained by altering the vehicle drive device 1 according to the present embodiment such that the output member 21 is coupled to the transmission output member 23 from the first axial side L1), all or most components of a portion corresponding to the transmission 4, the transmission output member 23, and the transmission case 41 which supports the transmission 4 and the transmission output member 23 can be commonalized with the existing vehicle drive device.

In the present embodiment, the first coupling portion 31 is disposed at a position on the radially inner side R2 with respect to the speed reducer 81 and at which the first coupling portion 31 overlaps the speed reducer 81 as viewed in the radial direction. Specifically, the first coupling portion 31 is disposed at a position on the radially inner side R2 with respect to the planetary gear mechanism 10 and at which the first coupling portion 31 overlaps the planetary gear mechanism 10 as viewed in the radial direction. In the present embodiment, as discussed above, the first coupling portion 31 is formed with the outer peripheral surface of the first end portion 23a and the inner peripheral surface of the tubular portion 24a engaged with each other. In the present embodiment, the sun gear 11 is disposed at a position on the radially outer side R1 with respect to the tubular portion 24a and at which the sun gear 11 overlaps the tubular portion 24a as viewed in the radial direction. The first coupling portion 31 is disposed at a position at which the first coupling portion 31 overlaps the sun gear 11 as viewed in the radial direction. In other words, the sun gear 11 is disposed at a position on the radially outer side R1 with respect to the tubular portion 24a and at which the sun gear 11 overlaps the first coupling portion 31 as viewed in the radial direction.

The sun gear 11 is coupled (spline-engaged in the present example) to a portion of the rotor shaft 25 disposed on the second axial side L2 with respect to the second bearing 92 to rotate together with the rotary electric machine 5. The sun gear 11 is rotatably supported by the intermediate member 24 via a bearing (a bush in the present example) disposed between the inner peripheral surface of the sun gear 11 and the outer peripheral surface of the tubular portion 24a. The carrier 12 is coupled so as to rotate together with the intermediate member 24 with an end portion of the annular plate-like portion 12a on the radially inner side R2 coupled (joined by welding in the present example) to a flange portion formed on the tubular portion 24a. The flange portion is formed so as to project toward the radially outer side R1 from a portion (here, an end portion of the tubular portion 24a on the second axial side L2) of the tubular portion 24a disposed on the second axial side L2 with respect to the sun gear 11. In this manner, in the present embodiment, the carrier 12 (specifically, the annular plate-like portion 12a) and the tubular portion 24a (here, an end portion of the tubular portion 24a on the second axial side L2) are coupled to each other on the second axial side L2 with respect to the sun gear 11.

In the present embodiment, as illustrated in FIG. 3, a rotation sensor 80 that detects rotation of the rotary electric machine 5 is provided on the first axial side L1 with respect to the rotary electric machine 5. Here, a resolver that includes a sensor stator fixed to the case 40 (specifically, the third wall portion 53) and a sensor rotor fixed to the rotor shaft 25 is used as the rotation sensor 80. In the present embodiment, a second coupling portion 32, which is a coupling portion between the intermediate member 24 and the output member 21, is disposed at a position on the radially inner side R2 with respect to the rotation sensor 80 and at which the second coupling portion 32 overlaps the rotation sensor 80 as viewed in the radial direction. In the present embodiment, the second coupling portion 32 is disposed at a position on the radially inner side R2 with respect to the rotor shaft 25 and at which the second coupling portion 32 overlaps the rotor shaft 25 as viewed in the radial direction. In the present embodiment, the second coupling portion 32 is disposed at a position on the radially inner side R2 with respect to the third bearing 93 and at which the second coupling portion 32 overlaps the third bearing 93 as viewed in the radial direction. In the present embodiment, further, the second coupling portion 32 is disposed at a position on the radially inner side R2 with respect to the coil end portion 5c (see FIG. 1) on the first axial side L1 of the stator 5b and at which the second coupling portion 32 overlaps the coil end portion 5c as viewed in the radial direction.

In the present embodiment, the output member 21 includes a tubular portion disposed on the radially outer side R1 with respect to an end portion of the intermediate member 24 on the first axial side L1, and the outer peripheral surface of the end portion of the intermediate member 24 and the inner peripheral surface of the tubular portion of the output member 21 are engaged (here, spline-engaged) with each other to form the second coupling portion 32. The output member 21 may include a tubular portion disposed on the radially inner side R2 with respect to an end portion of the intermediate member 24 on the first axial side L1, and the inner peripheral surface of the end portion of the intermediate member 24 and the outer peripheral surface of the tubular portion of the output member 21 may be engaged with each other to form the second coupling portion 32.

In the present embodiment, as illustrated in FIG. 3, an axial oil path 70 that extends in the axial direction L is formed inside at least one (both in the present example) of the transmission output member 23 and the intermediate member 24. Here, a portion of the axial oil path 70 formed inside the transmission output member 23 is defined as a first axial oil path 71, and a portion of the axial oil path 70 formed inside the intermediate member 24 is defined as a second axial oil path 72. In the present embodiment, a portion of the transmission output member 23 including the first end portion 23a is formed in the shape of a cylinder that extends in the axial direction L (here, in the shape of a bottomed cylinder that includes a bottom portion on the second axial side L2), and the first axial oil path 71 which opens toward the first axial side L1 is formed by a space surrounded by the inner peripheral surface of the cylindrical portion. The intermediate member 24 is formed in the shape of a cylinder that extends in the axial direction L. The second axial oil path 72 which opens toward the second axial side L2 is formed by a space surrounded by the inner peripheral surface of the intermediate member 24.

In the present embodiment, a supply portion 60 for oil to the axial oil path 70 is provided on the second axial side L2 with respect to the speed reducer 81 (planetary gear mechanism 10). Here, the supply portion 60 is formed by a hole portion formed so as to penetrate, in the radial direction R, a cylindrical portion of the transmission output member 23 disposed on the second axial side L2 with respect to the speed reducer 81 (planetary gear mechanism 10). The supply portion 60 is formed so as to open in the inner peripheral surface of the cylindrical portion so that an end portion of the supply portion 60 on the radially inner side R2 communicates with the first axial oil path 71. As illustrated in FIG. 3 in which the flow of oil is indicated by arrows, a hydraulic pressure after being controlled by a hydraulic control device 8 (see FIG. 2) passes sequentially through a supply oil path 73 and the supply portion 60 formed in the first wall portion 51 to be supplied to the first axial oil path 71. Oil supplied from the supply portion 60 to the first axial oil path 71 flows toward the first axial side L1 to be supplied to the second axial oil path 72.

A first discharge portion 61 that discharges oil in the first axial oil path 71 toward the radially outer side R1 with respect to the transmission output member 23 is formed in the transmission output member 23. The first discharge portion 61 is formed by a hole portion that penetrates, in the radial direction R, a portion of a cylindrical portion (a portion in which the first axial oil path 71 is formed) of the transmission output member 23 disposed on the first axial side L1 with respect to the supply portion 60. A second discharge portion 62 that discharges oil in the second axial oil path 72 toward the radially outer side R1 with respect to the intermediate member 24 is formed in the intermediate member 24. The second discharge portion 62 is formed by a hole portion that penetrates the intermediate member 24 in the radial direction R. Here, the second discharge portion 62 is formed at a plurality of locations in the axial direction L. In the present embodiment, the supply portion 60, the first discharge portion 61, and the second discharge portion 62 are disposed sequentially from the second axial side L2, and therefore the first discharge portion 61 is disposed upstream of the second discharge portion 62 in the direction in which oil flows in the axial oil path 70.

Oil discharged from the first discharge portion 61 toward the radially outer side R1 with respect to the transmission output member 23 is led to a lubrication oil path, which is formed inside the pinion shaft 15, to be used to lubricate the pinion shaft 16. In the present embodiment, oil discharged from the first discharge portion 61 flows toward the radially outer side R1 to be supplied to the sixth bearing 96. Oil after lubricating the sixth bearing 96 flows toward the radially outer side R1, and thereafter is trapped by an oil receiver 63 attached to the carrier 12 to be supplied to the lubricating oil path which is formed inside the pinion shaft 15. Oil discharged from the second discharge portion 62 toward the radially outer side R1 with respect to the intermediate member 24 is led to a cooling oil path in the rotary electric machine 5 to be used to cool the rotary electric machine 5. As discussed above, the first discharge portion 61 is disposed upstream of the second discharge portion 62 in the direction in which oil flows in the axial oil path 70. Therefore, oil in the axial oil path 70 can be preferentially discharged from the first discharge portion 61. Consequently, it is easy to appropriately supply oil for lubrication to the pinion shaft 16.

In the present embodiment, oil supplied from the supply portion 60 to the first axial oil path 71 flows toward the first axial side L1 to be supplied to the second axial oil path 72. However, the first axial oil path 71 and the second axial oil path 72 may not communicate with each other. In this case, a supply portion that supplies oil to the second axial oil path 72 is provided separately from the supply portion 60 for oil to the first axial oil path 71.

Second Embodiment

A vehicle drive device according to a second embodiment will be described with reference to the drawing (FIG. 4). Differences of the vehicle drive device according to the present embodiment from that according to the first embodiment will be mainly described below. Elements that are not specifically described are the same as those according to the first embodiment, and are given the same reference numerals to omit a detailed description.

In the present embodiment, the case 40 does not include the connection case 43, and the rotary electric machine case 42 includes the third wall portion 53. That is, the rotary electric machine case 42 includes both the functions of the rotary electric machine case 42 and the connection case 43 according to the first embodiment. In the present embodiment, the rotary electric machine case 42 includes a support member 54 in place of the second wall portion 52 according to the first embodiment. In the present embodiment, the speed reducer 81 is supported by the rotary electric machine case 42 (specifically, the support member 54) with the ring gear 13 fixed to the support member 54. In this manner, one rotary element (here, the ring gear 13) of the speed reducer 81 is fixed to the rotary electric machine case 42 (here, the support member 54). The support member 54 is disposed between the first wall portion 51 and the third wall portion 53 in the axial direction L. The speed reducer 81 (planetary gear mechanism 10) is disposed between the first wall portion 51 and the support member 54 in the axial direction L. The rotary electric machine 5 is disposed between the support member 54 and the third wall portion 53 in the axial direction L. In the present embodiment, the rotor 5a (specifically, the rotor shaft 25) is rotatably supported by the rotary electric machine case 42 via the third bearing 93. In the present embodiment, the rotary electric machine case 42 corresponds to the "second case portion".

In the present embodiment, the third wall portion 53 is formed integrally with the peripheral wall portion 42a of the rotary electric machine case 42. Therefore, the support member 54, which is disposed on the opposite side in the axial direction L of the rotary electric machine 5 from the side on which the third wall portion 53 is disposed, is a member that is separate from the peripheral wall portion 42a. Specifically, the support member 54 is disposed on the radially inner side R2 with respect to the peripheral wall portion 42a. That is, the support member 54 is disposed so as not to be exposed to the outer surface of the peripheral wall portion 42a. The support member 54 is integrally coupled to the peripheral wall portion 42a. In the example illustrated in FIG. 4, the support member 54 is fixed using a fixing member 46 (here, a fastening bolt) to the peripheral wall portion 42a or a member fixed to the peripheral wall portion 42a. The third wall portion 53 is formed integrally with the peripheral wall portion 42a by casting, for example.

In the present embodiment, the rotary electric machine case 42 includes both the first support portion 9A and the second support portion 9B. In the present embodiment, the support member 54 constitutes the second support portion 9B. Hence, the support member 54 includes the bearing attachment portion 55 and the radially extending portion 50. The speed reducer 81 (planetary gear mechanism 10) is supported by the rotary electric machine case 42 (specifically, the second support portion 9B (support member 54)), and disposed to face the first wall portion 51 in the axial direction L.

In the present embodiment, the rotation sensor 80 is disposed on the second axial side L2 with respect to the rotary electric machine 5. Specifically, the rotation sensor 80 is disposed between the rotor 5a and the speed reducer 81 (planetary gear mechanism 10) in the axial direction L. In the example illustrated in FIG. 4, a sensor stator of a resolver that constitutes the rotation sensor 80 is fixed to the support member 54. The rotation sensor 80 is disposed on the radially inner side R2 with respect to the stator 5b. Specifically, the rotation sensor 80 is disposed at a position at which the rotation sensor 80 overlaps the coil end portion 5c (the coil end portion 5c on the second axial side L2) as viewed in the radial direction. Here, the rotation sensor 80 is disposed such that a portion of the rotation sensor 80 on the first axial side L1 overlaps the coil end portion 5c as viewed in the radial direction.

In the present embodiment, in the second coupling portion 32 which is a coupling portion between the intermediate member 24 and the output member 21, spline teeth formed on the outer peripheral surface of an end portion of the intermediate member 24 on the first axial side L1 and spline teeth formed on the inner peripheral surface of a portion of a coupling member 26 on the second axial side L2 are spline-engaged with each other, and spline teeth formed on the outer peripheral surface of an end portion of the output member 21 on the second axial side L2 and spline teeth formed on the inner peripheral surface of a portion of the coupling member 26 on the first axial side L1 are spline-engaged with each other. That is, in the present embodiment, the intermediate member 24 is coupled to the output member 21 via the coupling member 26. The coupling member 26 is supported by the rotary electric machine case 42 (specifically, the third wall portion 53) via a bearing disposed on the first axial side L1 with respect to the third bearing 93.

Other Embodiments

Next, vehicle drive devices according to other embodiments will be described.

(1) In each of the embodiments described above, the first coupling portion 31 is disposed at a position on the radially inner side R2 with respect to the planetary gear mechanism 10 and at which the first coupling portion 31 overlaps the sun gear 11 as viewed in the radial direction. However, the present disclosure is not limited to such a configuration. The first coupling portion 31 may be disposed at a position at which the first coupling portion 31 does not overlap the sun gear 11 as viewed in the radial direction but at which the first coupling portion 31 overlaps a different portion (e.g. the annular plate-like portion 12a of the carrier 12) of the planetary gear mechanism 10 as viewed in the radial direction. Alternatively, the first coupling portion 31 may be disposed at a position that is different in the axial direction L from that of the speed reducer 81 (planetary gear mechanism 10) so as not to overlap the speed reducer 81 (planetary gear mechanism 10) as viewed in the radial direction.

(2) In the first embodiment described above, the second coupling portion 32 is disposed at a position on the radially inner side R2 with respect to the rotation sensor 80 and at which the second coupling portion 32 overlaps the rotation sensor 80 as viewed in the radial direction. However, the present disclosure is not limited to such a configuration. The second coupling portion 32 may be disposed at a position that is different in the axial direction L from that of the rotation sensor 80 so as not to overlap the rotation sensor 80 as viewed in the radial direction in the case where the rotation sensor 80 is disposed on the first axial side L1 with respect to the rotary electric machine 5 as in the first embodiment described above.

(3) In each of the embodiments described above, the intermediate member 24 includes the tubular portion 24a which is disposed on the radially outer side R1 with respect to the first end portion 23a of the transmission output member 23, and the outer peripheral surface of the first end portion 23a and the inner peripheral surface of the tubular portion 24a are engaged with each other to form the first coupling portion 31. However, the present disclosure is not limited to such a configuration. For example, the intermediate member 24 may include a tubular portion disposed on the radially inner side R2 with respect to the first end portion 23a of the transmission output member 23, and the outer peripheral surface of the tubular portion and the inner peripheral surface of the first end portion 23a may be engaged with each other to form the first coupling portion 31.

(4) In each of the embodiments described above, the joint portion 44 between the transmission case 41 and the rotary electric machine case 42 is disposed at a position on the radially outer side R1 with respect to the speed reducer 81 (planetary gear mechanism 10) and at which the joint portion 44 overlaps the speed reducer 81 (planetary gear mechanism 10) as viewed in the radial direction. However, the present disclosure is not limited to such a configuration. The joint portion 44 may be disposed at a position that is different in the axial direction L from that of the speed reducer 81 (planetary gear mechanism 10) so as not to overlap the speed reducer 81 (planetary gear mechanism 10) as viewed in the radial direction. Even in this case, a first portion of the transmission case 41 at which the shaft portion of the fastening bolt 45 is disposed or a second portion of the rotary electric machine case 42 at which the shaft portion of the fastening bolt 45 is disposed is preferably disposed at a position at which the first portion or the second portion overlaps the speed reducer 81 (planetary gear mechanism 10) as viewed in the radial direction. Alternatively, even in the case where the joint portion 44 is disposed at a position that is different in the axial direction L from that of the speed reducer 81 (planetary gear mechanism 10), at least one (preferably all) of the joint portion 44, the first portion, and the second portion is preferably disposed at a position that is different in the axial direction L from that of the rotary electric machine 5 so as not to overlap the rotary electric machine 5 (in particular, the stator core of the stator 5b) as viewed in the radial direction.

(5) In each of the embodiments described above, the axial oil path 70 which extends in the axial direction L is formed inside at least one of the transmission output member 23 and the intermediate member 24. However, the present disclosure is not limited to such a configuration. The axial oil path 70 which extends in the axial direction L may not be formed inside either of the transmission output member 23 and the intermediate member 24.

(6) In each of the embodiments described above, the planetary gear mechanism 10 includes the sun gear 11 which is coupled to the rotary electric machine 5, the carrier 12 which is coupled to the intermediate member 24, and the ring gear 13 which is fixed to the rotary electric machine case 42. However, the present disclosure is not limited to such a configuration. The planetary gear mechanism 10 may include a sun gear 11 coupled to the rotary electric machine case 42, a carrier 12 coupled to the intermediate member 24, and a ring gear 13 coupled to the rotary electric machine 5. A double-pinion planetary gear mechanism may also be used as the planetary gear mechanism 10. In this case, the planetary gear mechanism 10 may include a sun gear 11 coupled to the rotary electric machine 5, a carrier 12 fixed to the rotary electric machine case 42, and a ring gear 13 coupled to the intermediate member 24. Alternatively, the planetary gear mechanism 10 may include a sun gear 11 fixed to the rotary electric machine case 42, a carrier 12 coupled to the rotary electric machine 5, and a ring gear 13 coupled to the intermediate member 24.

(7) In each of the embodiments described above, the speed reducer 81 is supported by the rotary electric machine case 42 which includes the radially extending portion 50 and, specifically, one rotary element of the speed reducer 81 is fixed to the rotary electric machine case 42 which includes the radially extending portion 50. However, the present disclosure is not limited to such a configuration. An end wall portion (51) may also be used as a support wall that supports the speed reducer (81) in place of the radially extending portion (50). That is, the speed reducer 81 may be supported by the transmission case 41 which includes the first wall portion 51. For example, one rotary element of the speed reducer 81 may be fixed to the transmission case 41 (e.g. the first wall portion 51).

(8) A configuration disclosed in each of the embodiments discussed above can also be applied in combination with a configuration disclosed in any other embodiment (including a combination of the other embodiments described above) unless any contradiction occurs. Also regarding the other configurations, the embodiments disclosed herein are merely illustrative in all respects. Thus, a variety of alterations can be made, as appropriate, without departing from the scope and spirit of the present disclosure.

Summary of Above Embodiments

A summary of the vehicle drive device described above will be described below.

A vehicle drive device (1) includes: an input member (20) drivingly coupled to an internal combustion engine (2); an output member (21) drivingly coupled to wheels (3); a transmission (4) provided in a first power transfer path (T1) that connects between the input member (20) and the output member (21) to transfer rotation transferred from a side of the input member (20) to a transmission output member (23) with a speed of the rotation varied; a rotary electric machine (5) capable of transferring a drive force via a second power transfer path (T2) to a portion of the first power transfer path (T1) on a side of the output member (21) with respect to the transmission output member (23); a speed reducer (81) provided in the second power transfer path (T2) to transfer rotation transferred from a side of the rotary electric machine (5) to the side of the output member (21) with a speed of the rotation reduced; and a case (40); the rotary electric machine (5) and the speed reducer (81) are disposed coaxially with the transmission output member (23) on a first axial side (L1), which is one side in an axial direction (L), with respect to the transmission (4); the case (40) includes a first case portion (41) that supports the transmission (4) and the transmission output member (23), and a second case portion (42, 43) that supports the rotary electric machine (5); the first case portion (41) includes an end wall portion (51) disposed on the first axial side (L1) with respect to the transmission (4); the second case portion (42, 43) includes a first support portion (9A) disposed on the first axial side (L1) with respect to a rotor (5a) of the rotary electric machine (5) to support a rotor shaft (25) that rotates together with the rotor (5a), and a second support portion (9B) disposed on a second axial side (L2), which is opposite to the first axial side (L1) in the axial direction (L), with respect to the rotor (5a) to support the rotor shaft (25); the second support portion (9B) includes a bearing attachment portion (55) to which a rotor bearing (92) for supporting the rotor shaft (25) is attached, and a radially extending portion (50) that extends from the bearing attachment portion (55) toward an outer side in a radial direction (R); and the speed reducer (81) is disposed between the radially extending portion (50) and the end wall portion (51) in the axial direction (L) to face the radially extending portion (50) and the end wall portion (51) in the axial direction (L).

With this configuration, output torque of the rotary electric machine (5) can be transferred to the output member (21) via the speed reducer (81). Hence, it is easy to secure a necessary drive force by driving the wheels (3) by transferring, to the output member (21), rotation of the rotary electric machine (5) after the speed reducer (81) reduces the speed of the rotation, in addition to rotation of the internal combustion engine (2) after the transmission (4) varies the speed of the rotation.

With the configuration described above, the transmission (4) and the transmission output member (23) can be supported by the first case portion (41), and the rotary electric machine (5) can be supported on both sides in the axial direction (L) by the first support portion (9A) and the second support portion (9B) of the second case portion (42, 43). In the configuration described above, the speed reducer (81) is disposed between the radially extending portion (50) of the second case portion (42, 43) and the end wall portion (51) of the first case portion (41) in the axial direction (L) to face the radially extending portion (50) and the end wall portion (51) in the axial direction (L). Therefore, the speed reducer (81) can be supported using at least one of the second case portion (42, 43) which includes the radially extending portion (50) and the first case portion (41) which includes the end wall portion (51), even if no wall portion is provided to support the speed reducer (81), separately from the radially extending portion (50) and the end wall portion (51). That is, a dedicated support wall for supporting the speed reducer (81) can be removed by causing the radially extending portion (50) or the end wall portion (51) to also serve as a support wall that supports the speed reducer (81), and it is possible to reduce the axial dimension of the vehicle drive device (1) compared to the case where such a dedicated support wall is provided.

With the configuration described above, it is advantageously easy to reduce the span of support for the rotor shaft (25) by the first support portion (9A) and the second support portion (9B), and easy to enhance the precision in supporting the rotor shaft (25), compared to the case where the speed reducer (81) is disposed between the rotary electric machine (5) and the radially extending portion (50) in the axial direction (L).

With the configuration described above, as described above, it is possible to reduce the axial dimension of the vehicle drive device (1) while appropriately supporting each rotary member.

Preferably, one rotary element of the speed reducer (81) is fixed to the second case portion (42, 43).

With this configuration, the speed reducer (81) can be supported by the second case portion (42, 43) by effectively using the second support portion (9B) for supporting the rotor shaft (25), for example. With this configuration, the speed reducer (81) can be housed inside the case (40) appropriately by joining the first case portion (41) and the second case portion (42, 43) to each other and disposing the speed reducer (81) to face the end wall portion (51) in the axial direction (L), while the speed reducer (81) may be exposed to the outside of the second case portion (42, 43) before the first case portion (41) and the second case portion (42, 43) are joined to each other.

Preferably, the transmission output member (23) is rotatably supported by the first case portion (41) via an output member bearing (91); and the rotor (5a) is rotatably supported by the second case portion (42, 43) via the rotor bearing (92).

With this configuration, the transmission output member (23) and the rotor (5a) can be supported independently of each other. Hence, each rotary member can be supported appropriately while causing the radially extending portion (50) or the end wall portion (51) to also serve as a support wall that supports the speed reducer (81) as described above.

Preferably, a drive force of the rotary electric machine (5) is transferred via the second power transfer path (T2) to an intermediate member (24) provided in the first power transfer path (T1); the speed reducer (81) and the intermediate member (24) are supported by the second case portion (42, 43); the intermediate member (24) is disposed coaxially with the transmission output member (23) on the first axial side (L1) with respect to the transmission (4); and the intermediate member (24) is coupled to the transmission output member (23) from the first axial side (L1) with the second case portion (42, 43) joined to the first axial side (L1) of the first case portion (41).

With this configuration, all or most components of the transmission (4), the transmission output member (23), and the first case portion (41) which supports the transmission (4) and the transmission output member (23) can be commonalized even in the case where the specifications of the rotary electric machine (5) or the speed reducer (81) are changed. In the case where hybridization is achieved by adding the rotary electric machine (5) to an existing vehicle drive device that includes only the internal combustion engine (2) as a drive force source for the wheels (3), all or most components of a portion corresponding to the transmission (4), the transmission output member (23), and the first case portion (41) which supports the transmission (4) and the transmission output member (23) can be commonalized with the existing vehicle drive device. As a result, it is possible to achieve the vehicle drive device (1) which facilitates a change in the specifications of the rotary electric machine (5) or the speed reducer (81) or hybridization of the existing vehicle drive device.

In the configuration in which the intermediate member (24) is coupled to the transmission output member (23) from the first axial side (L1) as described above, preferably, a first coupling portion (31), which is a coupling portion between the transmission output member (23) and the intermediate member (24), is disposed at a position on an inner side in the radial direction (R) with respect to the speed reducer (81) and at which the first coupling portion (31) overlaps the speed reducer (81) as viewed in the radial direction along the radial direction (R).

With this configuration, the size of the entire device in the axial direction (L) can be reduced compared to the case where the first coupling portion (31) is disposed at a position that is different in the axial direction (L) from that of the speed reducer (81) so as not to overlap the speed reducer (81) as viewed in the radial direction.

In the configuration in which the first coupling portion (31) is disposed as described above, preferably, the speed reducer (81) is constituted using a planetary gear mechanism (10) that includes a sun gear (11) coupled to the rotary electric machine (5), a carrier (12) coupled to the intermediate member (24), and a ring gear (13) fixed to the second case portion (42, 43); the intermediate member (24) includes a tubular portion (24a) disposed on an outer side in the radial direction (R) with respect to a first end portion (23a) which is an end portion of the transmission output member (23) on the first axial side (L1); an outer peripheral surface of the first end portion (23a) and an inner peripheral surface of the tubular portion (24a) are engaged with each other to form the first coupling portion (31); and the sun gear (11) is disposed at a position on an outer side in the radial direction (R) with respect to the tubular portion (24a) and at which the sun gear (11) overlaps the first coupling portion (31) as viewed in the radial direction.

With this configuration, the rotary electric machine (5) and the sun gear (11) can be appropriately coupled to each other, and the transmission output member (23) and the carrier (12) and the intermediate member (24) can be appropriately coupled to each other, while disposing the first coupling portion (31) and the planetary gear mechanism (10) which constitutes the speed reducer (81) so as to overlap each other as viewed in the radial direction, by disposing the tubular portion (24a) between the first end portion (23a) and the sun gear (11) in the radial direction (R).

Preferably, an axial oil path (70) that extends in the axial direction (L) is formed inside at least one of the transmission output member (23) and the intermediate member (24); and a supply portion (60) that supplies oil to the axial oil path (70) is provided on the second axial side (L2) with respect to the speed reducer (81).

With this configuration, the supply portion (60) for oil to the axial oil path (70) can be disposed on the opposite side in the axial direction (L) of the speed reducer (81) from the side on which the rotary electric machine (5) is disposed. Hence, in the case where oil in the axial oil path (70) is supplied to both the speed reducer (81) and the rotary electric machine (5), the first discharge portion (61) for supplying oil in the axial oil path (70) to the speed reducer (81) can be disposed at a position closer to the supply portion (60) (i.e. an upstream position in the direction in which oil flows in the axial oil path (70)) than the position of the second discharge portion (62) for supplying oil in the axial oil path (70) to the rotary electric machine (5). This facilitates appropriately supplying oil for lubrication to the speed reducer (81).

Preferably, a rotation sensor (80) that detects rotation of the rotary electric machine (5) is provided on the first axial side (L1) with respect to the rotary electric machine (5); and a second coupling portion (32), which is a coupling portion between the intermediate member (24) and the output member (21), is disposed at a position on an inner side in the radial direction (R) with respect to the rotation sensor (80) and at which the second coupling portion (32) overlaps the rotation sensor (80) as viewed in the radial direction along the radial direction (R).

With this configuration, the size of the entire device in the axial direction (L) can be reduced compared to the case where the second coupling portion (32) is disposed at a position that is different in the axial direction (L) from that of the rotation sensor (80) so as not to overlap the rotation sensor (80) as viewed in the radial direction. With this configuration, it is advantageously easy to secure a high degree of freedom in disposing the rotation sensor (80), since the rotation sensor (80) is disposed on the opposite side in the axial direction (L) of the rotary electric machine (5) from the side on which the speed reducer (81) is disposed.

In the vehicle drive device (1) according to each of the configurations described above, preferably, a joint portion (44) between the first case portion (41) and the second case portion (42, 43) is disposed at a position on an outer side in the radial direction (R) with respect to the speed reducer (81) and at which the joint portion (44) overlaps the speed reducer (81) as viewed in the radial direction along the radial direction (R).

With this configuration, the joint portion (44) between the first case portion (41) and the second case portion (42, 43) can be disposed at a position at which the joint portion (44) overlaps the speed reducer (81) as viewed in the radial direction, the dimension of the speed reducer (81) in the radial direction (R) being easily reduced compared to that of the rotary electric machine (5). Hence, the joint portion (44) is easily disposed on the radially inner side (R2), and it is easy to reduce the size of the case (40) in the radial direction (R), compared to the case where the joint portion (44) is disposed at a position at which the joint portion (44) overlaps the rotary electric machine (5) as viewed in the radial direction.

It is only necessary that the vehicle drive device according to the present disclosure should achieve at least one of the effects discussed above.

DESCRIPTION OF THE REFERENCE NUMERALS

1 VEHICLE DRIVE DEVICE
2 INTERNAL COMBUSTION ENGINE
3 WHEEL
4 TRANSMISSION
5 ROTARY ELECTRIC MACHINE
5a ROTOR
9A FIRST SUPPORT PORTION
9B SECOND SUPPORT PORTION
10 PLANETARY GEAR MECHANISM
11 SUN GEAR
12 CARRIER
13 RING GEAR
20 INPUT MEMBER
21 OUTPUT MEMBER
23 TRANSMISSION OUTPUT MEMBER
23a FIRST END PORTION
24 INTERMEDIATE MEMBER
24a TUBULAR PORTION
25 ROTOR SHAFT
31 FIRST COUPLING PORTION
32 SECOND COUPLING PORTION
40 CASE
41 TRANSMISSION CASE (FIRST CASE PORTION)
42 ROTARY ELECTRIC MACHINE CASE (SECOND CASE PORTION)
43 CONNECTION CASE (SECOND CASE PORTION)
44 JOINT PORTION
50 RADIALLY EXTENDING PORTION
51 FIRST WALL PORTION (END WALL PORTION)
55 BEARING ATTACHMENT PORTION
60 SUPPLY PORTION
70 AXIAL OIL PASSAGE
80 ROTATION SENSOR
81 SPEED REDUCER
91 FIRST BEARING (OUTPUT MEMBER BEARING)
92 SECOND BEARING (ROTOR BEARING)
L AXIAL DIRECTION
L1 FIRST AXIAL SIDE
L2 SECOND AXIAL SIDE
R RADIAL DIRECTION
T1 FIRST POWER TRANSFER PATH
T2 SECOND POWER TRANSFER PATH

The invention claimed is:

1. A vehicle drive device comprising:
an input member drivingly coupled to an internal combustion engine;
an output member drivingly coupled to wheels;
a transmission provided in a first power transfer path that connects between the input member and the output member to transfer rotation transferred from a side of the input member to a transmission output member with a speed of the rotation varied;

a rotary electric machine capable of transferring a drive force via a second power transfer path to a portion of the first power transfer path on a side of the output member with respect to the transmission output member;

a speed reducer provided in the second power transfer path to transfer rotation transferred from a side of the rotary electric machine to the side of the output member with a speed of the rotation reduced; and a case, wherein:

the rotary electric machine and the speed reducer are disposed coaxially with the transmission output member on a first axial side, which is one side in an axial direction, with respect to the transmission;

the case includes a first case portion that supports the transmission and the transmission output member, and a second case portion that supports the rotary electric machine;

the first case portion includes an end wall portion disposed on the first axial side with respect to the transmission;

the second case portion includes a first support portion disposed on the first axial side with respect to a rotor of the rotary electric machine to support a rotor shaft that rotates together with the rotor, and a second support portion disposed on a second axial side, which is opposite to the first axial side in the axial direction, with respect to the rotor to support the rotor shaft;

the second support portion includes a bearing attachment portion to which a rotor bearing for supporting the rotor shaft is attached, and a radially extending portion that extends from the bearing attachment portion toward an outer side in a radial direction; and the speed reducer is disposed between the radially extending portion and the end wall portion in the axial direction to face the radially extending portion and the end wall portion in the axial direction.

2. The vehicle drive device according to claim 1, wherein one rotary element of the speed reducer is fixed to the second case portion.

3. The vehicle drive device according to claim 1, wherein:

the transmission output member is rotatably supported by the first case portion via an output member bearing; and the rotor is rotatably supported by the second case portion via the rotor bearing.

4. The vehicle drive device according to claim 1, wherein:

a drive force of the rotary electric machine is transferred via the second power transfer path to an intermediate member provided in the first power transfer path;

the speed reducer and the intermediate member are supported by the second case portion;

the intermediate member is disposed coaxially with the transmission output member on the first axial side with respect to the transmission; and the intermediate member is coupled to the transmission output member from the first axial side with the second case portion joined to the first axial side of the first case portion.

5. The vehicle drive device according to claim 4, wherein a first coupling portion, which is a coupling portion between the transmission output member and the intermediate member, is disposed at a position on an inner side in the radial direction with respect to the speed reducer and at which the first coupling portion overlaps the speed reducer as viewed in the radial direction along the radial direction.

6. The vehicle drive device according to claim 5, wherein:

the speed reducer is constituted using a planetary gear mechanism that includes a sun gear coupled to the rotary electric machine, a carrier coupled to the intermediate member, and a ring gear fixed to the second case portion;

the intermediate member includes a tubular portion disposed on an outer side in the radial direction with respect to a first end portion which is an end portion of the transmission output member on the first axial side;

an outer peripheral surface of the first end portion and an inner peripheral surface of the tubular portion are engaged with each other to form the first coupling portion; and the sun gear is disposed at a position on an outer side in the radial direction with respect to the tubular portion and at which the sun gear overlaps the first coupling portion as viewed in the radial direction.

7. The vehicle drive device according to claim 4, wherein:

an axial oil path that extends in the axial direction is formed inside at least one of the transmission output member and the intermediate member; and a supply portion that supplies oil to the axial oil path is provided on the second axial side with respect to the speed reducer.

8. The vehicle drive device according to claim 4, wherein:

a rotation sensor that detects rotation of the rotary electric machine is provided on the first axial side with respect to the rotary electric machine; and a second coupling portion, which is a coupling portion between the intermediate member and the output member, is disposed at a position on an inner side in the radial direction with respect to the rotation sensor and at which the second coupling portion overlaps the rotation sensor as viewed in the radial direction along the radial direction.

9. The vehicle drive device according to claim 1, wherein a joint portion between the first case portion and the second case portion is disposed at a position on an outer side in the radial direction with respect to the speed reducer and at which the joint portion overlaps the speed reducer as viewed in the radial direction along the radial direction.

* * * * *